April 25, 1961 O. E. LESSLY 2,981,380
HYDRAULIC BRAKING APPARATUS
Filed Feb. 26, 1960 3 Sheets-Sheet 1

INVENTOR.
OSWALD E. LESSLY,
BY
McMorrow, Berman & Davidson
ATTORNEYS.

April 25, 1961  O. E. LESSLY  2,981,380
HYDRAULIC BRAKING APPARATUS
Filed Feb. 26, 1960

INVENTOR.
OSWALD E. LESSLY,
BY
McMorrow, Berman & Davidson
ATTORNEYS.

United States Patent Office 2,981,380
Patented Apr. 25, 1961

2,981,380

HYDRAULIC BRAKING APPARATUS

Oswald E. Lessly, 466 Giano Ave., La Puente, Calif.

Filed Feb. 26, 1960, Ser. No. 11,319

3 Claims. (Cl. 188—90)

This invention relates to a new and useful improvement in hydraulic braking apparatus and, more specifically, the instant invention pertains to a device especially designed to control the speed of a rotatable element by building up a torque load with a special mechanism connected to a torque converter.

One of the primary objects of this invention is to provide a hydraulic or torque brake especially designed to control the speed of large transport truck trailers, trucks and other vehicles moving down grade in mountains or hills, and to provide braking power for the control of winch drums and/or prime movers and machinery that require braking power for controlling speed.

A further object of this invention is to provide a hydraulic or torque brake which does not require alteration nor will interfere in any way with the present conventional braking systems presently used on trucks, trailers, winches and other machinery, and is especially designed for controlling the speed of automotive vehicles and other mechanisms without the use of friction brakes.

This invention contemplates, as a still further object thereof, the provision of the device of the type generally described supra, the device being non-complex in construction and assembly, inexpensive to manufacture and maintain, and which is durable in use.

Other and further objects and advantages of the instant invention will become more evident from a consideration of the following specification when read in conjunction with the annexed drawings, in which.

Figure 1:
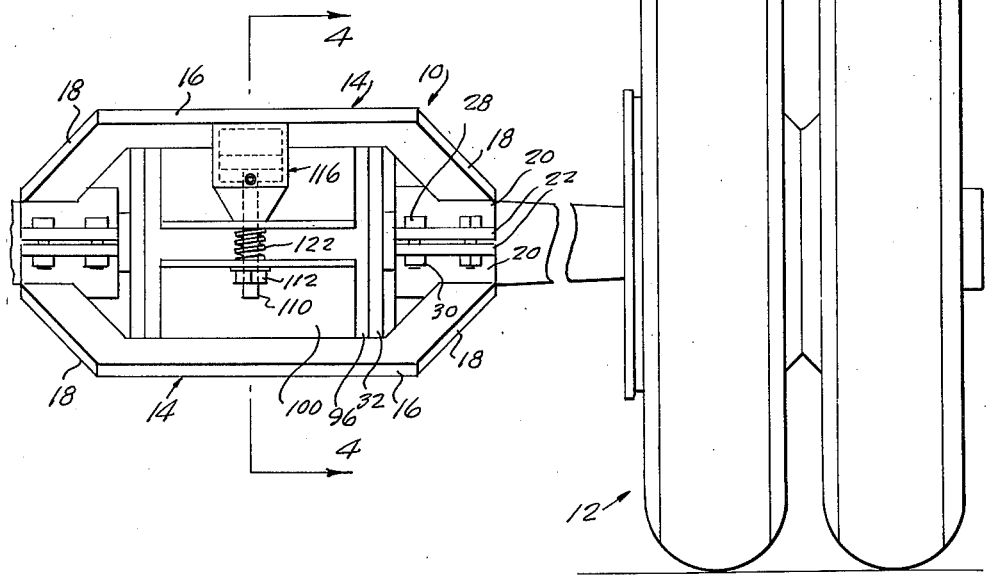
Figure 1 is a side elevational view of a hydraulic or torque brake constructed in accordance with this invention and shown as being connected with dual truck wheels.
Figure 2:
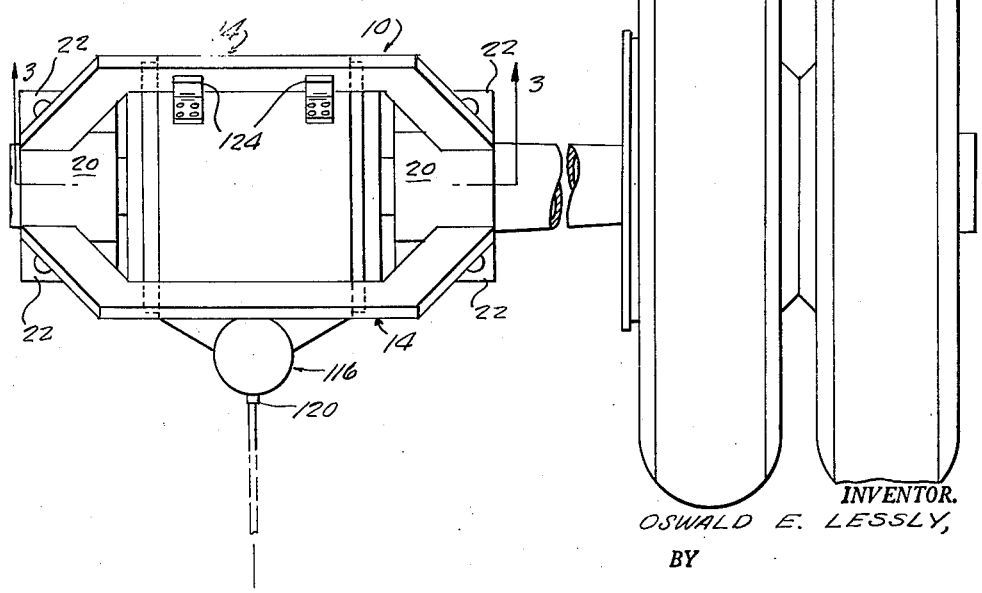
Figure 2 is a top plan view of the brake and associated wheels shown in Figure 1.

Reference numeral 10 designates, in general, a hydraulic or torque brake constructed in accordance with the teachings of this invention, the brake 10 being designed in the instant application of the invention, to apply braking power to the dual wheels 12 of a land vehicle such as, for example, the wheels of a trailer or tractor (not shown). The torque brake comprises a frame which includes a plurality of substantially flat U-shaped brackets 14 each having an elongated substantially rectangular bight portion 16 from the opposed ends of which project arms 18, the arms diverging away from each other. In the instant case, four of the brackets 14 are shown of which the remotely disposed ends of the arms 18 of a first pair of brackets 14 are rigidly secured to a pair of semi-cylindrical clamping members 20 having laterally extending outwardly projecting flanges 22 at each longitudinal marginal edge thereof.

The second pair of brackets 14 have the remotely disposed ends of their respective arms 18 also secured to an identical pair of semi-cylindrical clamping members 20 having identical flanges 22.

As is seen in the several figures of the drawings, each pair of clamping members 20 are engaged around the adjacent ends of a pair of axle housings 24 that surround dual axles 26 for each pair of dual wheels 12. Clamping engagement is maintained between the clamping members 20 and the axle housings 24 by means of bolts 28 and nuts 30, the bolts 28 passing through each adjacent and confronting pair of flanges 22. The adjacent inner ends of the clamping members 20 project beyond the adjacent inner ends of the axles 26 to serve a function to be described.

Reference numerals 32 denote a pair of substantially cylindrical end plates each having an outwardly projecting cylindrical boss 34 integral therewith and an integrally formed hub 36. The end plates, bosses and hubs are each provided with a continuous coaxial bore 38.

The bores 38 of the hubs 36 are internally splined for splined connection with the splined ends 40 of the axles 26, and the hubs 36 are journalled for rotation in bearings 42 disposed within the projecting ends of the clamping members 20 and between the adjacent ends of the axle housings 24 and the bosses 34.

Figure 3:
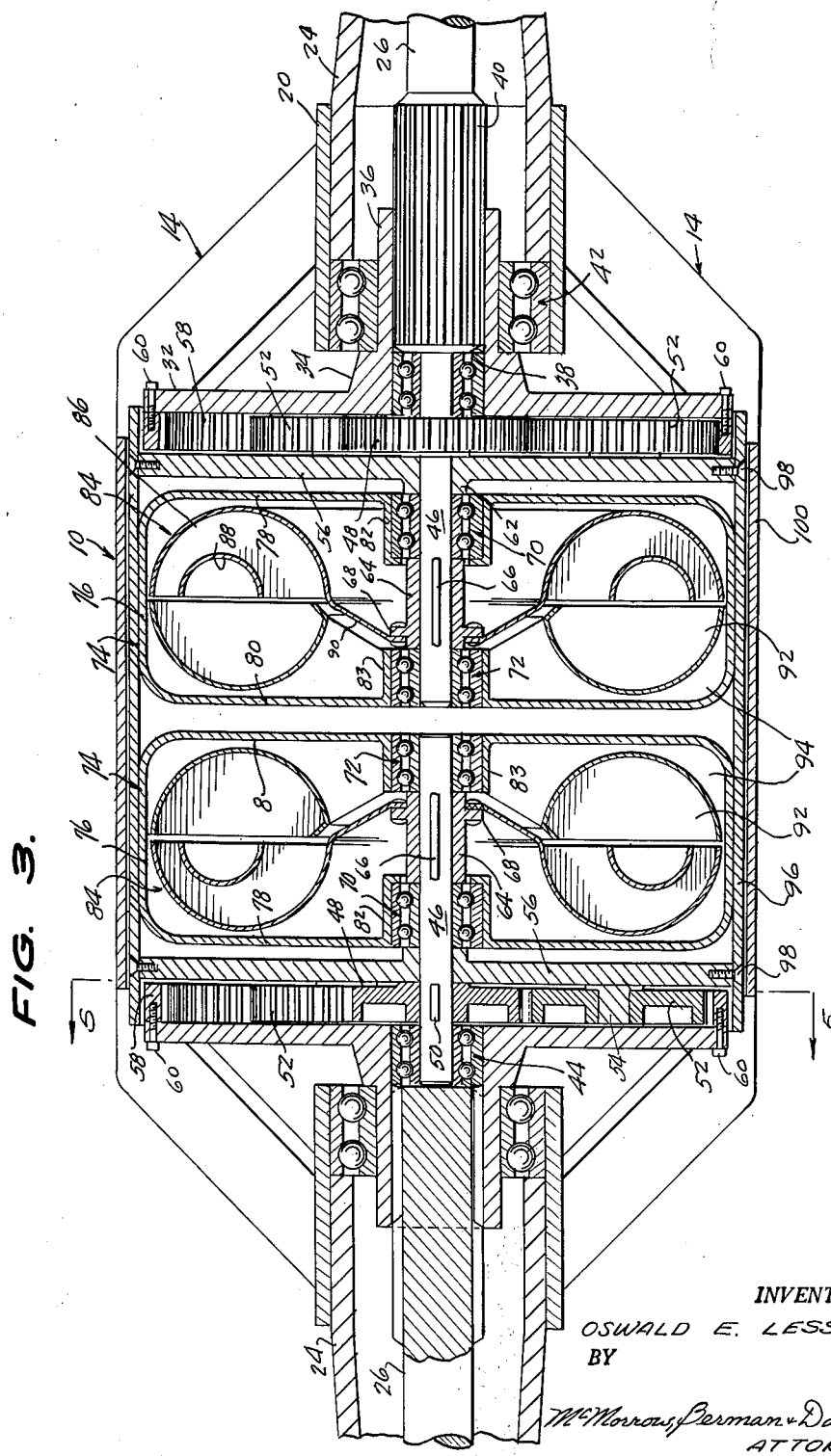
Figure 3 is an enlarged detail cross-sectional view, Figure 3 being taken substantially on the horzontal plane of line 3—3 of Figure 2, looking in the direction of the arrows.
Figure 5:
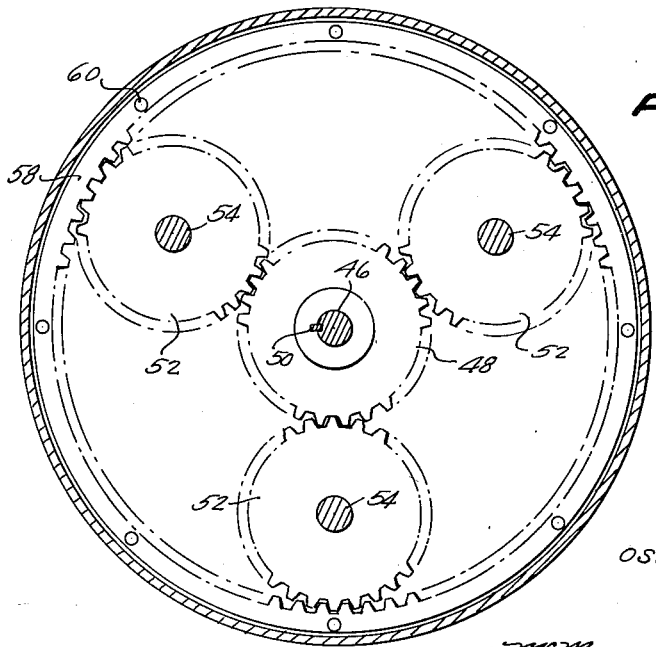
Figure 5 is an end elevational view of the gearing assembly for the torque converter.

The bores 38 of the end plates 32 and bosses 34 receive bearings 44 in which are journalled, respectively, one of the ends of a pair of elongated shafts 46. As is seen in Figure 3, the shafts 46 extend inwardly towards each other and each has mounted thereon a spur gear 48 keyed thereto at 50, the gears 48 being substantially concentric with each of the plates 32 immediately adjacent thereto. The spur gears 48 each mesh with the idler gears 52 (see Figures 3 and 5), rotatably mounted on stub shafts 54 which project laterally away from a pair of discoidal members 56 mounted on the shafts 46 respectively. Each series of idler gears 52 are spaced 120 degrees apart and mesh, in turn, with internal ring gears 58, respectively, fixedly secured to the end plates 32 as by a plurality of screws 60 or by the other conventional means. The discoidal members 56 are each mounted for rotation on, respectively, one of the shafts 46, and each is formed with a hub 62.

Telescopically mounted on each of the shafts 46 is a sleeve 64 which is keyed thereto at 66 for rotation therewith, the sleeves each being formed with a laterally extending circumferential flange 68 to serve a function to be described infra. Each of the shafts 46 is also journalled in bearings 70, 72, of which, the former is disposed intermediate the hub 62 and the sleeve 64, and the latter is located adjacent the inner end of the shaft 46 and the flanged end of the sleeve 64, the latter being held against displacement by conventional means not shown.

Reference numeral 74 denotes, in general, a conventional torque converter which includes a pair of substantially hollow cylindrical casings each having a peripheral end wall 76 and a pair of laterally spaced, substantially parallel side walls 78, 80. Each of the side walls 78 has a centrally located internal hub 82 journalled on the bearing 70, and each of the side walls 80 is also provided with an internal hub 83, centrally located, and which is journalled for rotation on the bearing 72. Disposed within each of the casings 74 is a conventional rotor 84 which includes a plurality of radially spaced plates 86 interrupted intermediate their respective ends by a semi-spherical channel member 88. The plates 86 connect via a gusset plate 90 with the flange 68. The stator 92 is connected to the side wall 80 and end wall 76 by means of insert plates 94.

Each of the end walls 76 is fixedly secured to the inner surface of a substantially cylindrical drum 96 that is fixedly connected by screws 98 to the opposed discoidal members 56.

Figure 4:
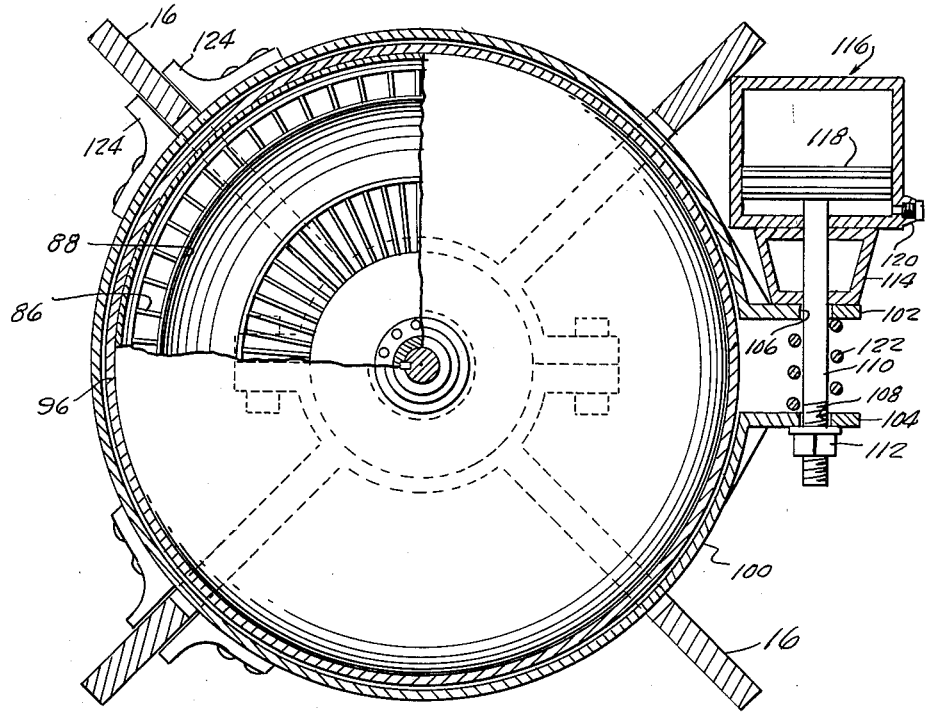
Figure 4 is an enlarged detail cross-sectional view, parts being broken away to illustrate details of the torque converter, Figure 4 being taken substantially on the vertical plane of line 4—4 of Figure 1, looking in the direction of the arrows.

Surrounding the drum 96 is a cylindrical split brake shoe 100, the opposed ends of which terminate in laterally offset flanges 102, 104 centrally apertured at 106, 108, respectively, to slidably receive therethrough a piston rod 110 (see Figure 4). The piston rod 110 has adjustably threaded thereon at one of its ends a nut 112, while the other end thereof projects through an inverted substantially hollow conical spacer member 114 into a substantially hollow air cylinder 116 for connection with a reciprocable piston 118. Reference numeral 120 indicates a coupling for connecting the cylinder 116 with a source of air under pressure. Interposed between the flanges 102, 104 and surrounding the rod 110 is a helicoidal spring 122 which constantly biases the flanges 102, 104 for movement away from each other, that is, for movement to effect release of the brake shoe 100 from the drum 96. To prevent buckling and shifting of the shoe 100 the same is provided with one or more pairs of abutment members 124 disposed adjacent to and on opposite sides of the bight 16 of at least one of the brackets 14. It is seen in Figure 4 that the shoe 100 clears the bight portions 16 of the brackets 14.

With the component elements of the torque brake assembled and disposed as described above and as illustrated in the drawings, the operation thereof is deemed to be self-evident. The air cylinder 116 is, of course, connected with a source of air under high pressure and controlled through a valve having an operating lever mounted on the dashboard of the operating vehicle (not shown). The air under pressure supplied to the cylinder 116 may be obtained from the air pressure utilized in the conventional vehicle braking system.

When the torque brake is not in use, the torque converter units 74 and all elements disposed therein and connected therewith including the drum 96 will rotate freely with the wheel axles 26. When it is desired to slow the speed of the axle R.P.M. or to slow the vehicle, the operator admits air under pressure to the cylinder 116 below the piston 118. This causes the piston 118 to move upwardly (as viewed in Figure 4) and in so moving the piston 118 carries its piston rod 110 in the same direction. The nut 112, bearing against the flange 104, causes the flange 104 to move toward the flange 102 and thereby tighten the shoe 100 against the drum 96. This action completely stops the drum 96, the housing for the torque converters including the end wall 76 and side walls 78, 80 thereof. Rotation of the end plates 56 is also halted. This places the gearing mechanism into action.

Under these conditions, the shafts 26 together with their splined ends 40 which are splined to the hubs 36 causes the internal ring gears 58 to rotate around the idler gears 52 which, in turn, drives the spur gear 48 at a much higher R.P.M. than the R.P.M. of the wheels and axles, depending, of course, on the selected ratio of the gears. As the spur gears 48 rotate the rotors 84 are also rotated thereby building up a high torque load inside each of the torque converters which exercises tremendous holding or braking power through the axles 26. Through the operation of the above referred to valve for the air cylinder 116, air may be expelled therefrom and, the flange 104 is then forced downwardly, reference again being made to Figure 4 of the drawings, under the bias exerted by the helicoidal springs 122. The downward movement of the flange 104 causes the shoe 100 to resume its normal position out of contact with the brake drum 96 thus releasing the applied braking force.

It will be understood that the R.P.M. of the truck wheels 12 are too slow to build up a torque load in the torque converter units, and that the gearing mechanism is so designed as to increase speed to the torque converters sufficiently high to build up a high torque load which creates the braking or holding force through the axles 26 to the wheels 12.

While the above invention has been recited as comprising an original installation in a motor vehicle, it will be understood that the same could be incorporated in a conventional truck, trailer or other similar vehicle presently in use. The installation may be simply made by cutting away a center portion of the axle housing of the vehicle and to subsequently weld thereto the frame members 14 and their associated clamping members 20.

Having described and illustrated in detail one embodiment of this invention, it will be understood that the same is offered merely by way of example, and that the instant invention is to be limited only by the scope of the appended claims.

What is claimed is:

1. A torque brake for a vehicle having a pair of coaxially aligned dual axles, said torque brake comprising a cylindrical end plate for each of said axles, means connecting one end of said axles with its said associated end plate centrally of the latter for rotation therewith, each of said end plates having an internal gear ring fixedly secured thereto adjacent the outer marginal edge thereof, a shaft for each of said end plates, said shaft having one of its ends journalled for rotation in said end plate and in coaxial relation with the adjacent one of said axles, a discoidal member mounted on each of said shafts, said shafts being rotatable with and relative to said discoidal members, a spur gear mounted on each of said shafts and disposed in concentric relation relative to the adjacent ring gear and surrounded thereby in spaced relation relative thereto, a plurality of stub shafts projecting laterally from each of said discoidal members towards the adjacent one of said end plates, a plurality of idler gears mounted for free rotation, respectively, on said stub shafts and meshing with said spur gears and said ring gears, a torque converter mounted on each of said shafts for rotation therewith or relative thereto, said torque converters each having its rotor side keyed to its associated shaft for rotation therewith, a drum fixedly connected to and surrounding said torque converters and being fixedly connected to said discoidal members, a split cylindrical shoe surrounding said drum in normally spaced relation relative thereto, and means selectively operable to tighten said shoe against said drum to brake said axle through said torque converter.

2. A torque brake as defined in claim 1 wherein the adjacent ends of said shoe are provided with laterally projecting flanges and said last named means include a cylinder supported on one of said flanges and having a piston disposed therein for reciprocation, a piston rod extending through said flanges and including means thereon for moving one of said flanges towards the other, whereby upon activation of said piston in one direction said flanges are drawn towards each other to clamp said shoe against said drum to effect a braking of said axles and upon activation of said piston in the other direction said braking action is released.

3. A torque brake as defined in claim 2, and an axle housing for each of said axles, means disposed within adjacent ends of each of said housings for rotatably supporting said axles therein, and frame means rigidly connecting the adjacent ends of said axle housings and spanning said torque brake.

References Cited in the file of this patent

UNITED STATES PATENTS 2,219,215    Anderson    Oct. 22, 1940
2,929,214    Stump et al.    Mar. 22, 1960